United States Patent [19]

Jordan

[11] Patent Number: 4,710,628

[45] Date of Patent: Dec. 1, 1987

[54] FAULT DETECTING APPARATUS

[75] Inventor: Barry J. Jordan, Heage, England

[73] Assignee: Jordon Instruments (Derby) Limited, England

[21] Appl. No.: 810,182

[22] Filed: Dec. 18, 1985

[51] Int. Cl.⁴ .......................... G01J 1/00; G01F 23/00
[52] U.S. Cl. ................................. 250/341; 250/358.1; 250/359.1; 374/4
[58] Field of Search ................... 250/341, 358.1, 359.1, 250/227, 231 R; 33/556, 558; 374/4, 5, 205

[56] References Cited

U.S. PATENT DOCUMENTS

| | | | |
|---|---|---|---|
| 4,141,247 | 2/1979 | Schlick | 374/205 |
| 4,513,507 | 4/1985 | Laskowski | 33/556 |
| 4,522,147 | 6/1985 | Kroll et al. | 374/205 |

Primary Examiner—Janice A. Howell
Attorney, Agent, or Firm—W. Thad Adams, III

[57] ABSTRACT

A probe for detecting structural faults in materials comprises a body (10) pivotally mounting therein a bell crank lever (38). The latter mounts at one end an external foot (48) for engaging with the material and at its other end presents an optical window (44,46) normally disposed in a gap between aligned ends within the body (10) of fibre optic cables (24,30). An infra-red beam is transmitted along the cables (24,30) and any slight movement of the foot (48) caused by a fault in the material will displace the optical window to interrupt the infra-red beam and thus give an indication of structural or component failure. Such a probe is isolated electrically and is free from sparking and fire hazards.

6 Claims, 3 Drawing Figures

FAULT DETECTING APPARATUS

This invention relates to a fault detecting apparatus and particularly an apparatus for non-destructive detecting of structural faults in materials in hostile or inaccessible areas for example oil rigs and the petrochemical industry.

Problems are encountered in using probes for detecting faults in such areas where conventional x-ray and ultrasonic test techniques cannot be used, equipment being required to be electrically isolated and free from sparking and fire hazards.

According to the present invention there is provided apparatus for detecting a structural fault in a material, said apparatus comprising a substantially closed body, sensing means which is pivotally mounted within the body and which provides a first part extending externally of the body for continuous engagement with the material to thereby directly detect any structural fault therein, and a second part presenting a path for transmission of energy therethrough, means for transmitting a beam of said energy and means for receiving the beam of said energy, said second part of the sensing means being normally positioned with the transmission path aligned with the transmitting and receiving means, but being movable in the event of a structural fault on the material being continuously monitored by said first part, whereby to affect the transmission of energy, the energy transmitting means comprising a first fibre optic cable connected to the body with an end located therein for transmission of light into the body and the energy receiving means comprising a further fibre optic cable having an end within the body aligned with said end of the first cable.

Preferably the fibre optic cables are provided for the transmission of infra-red light.

Preferably also, the pivotally mounted means comprises a lever of generally bell crank configuration having a first arm defining the transmission path at a free end thereof, and a second arm providing said first part at a free end thereof. The length of the first and second arms may be in a ratio of 8:1.

An embodiment of the present invention will now be described by way of example only, with reference to the accompanying drawings, in which.

Figure 1:
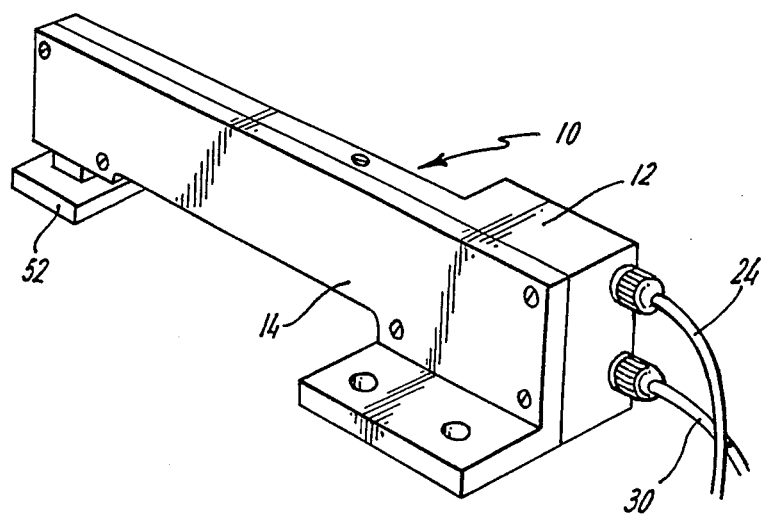
FIG. 1 is a perspective view of an apparatus according to the invention.
Figure 2:
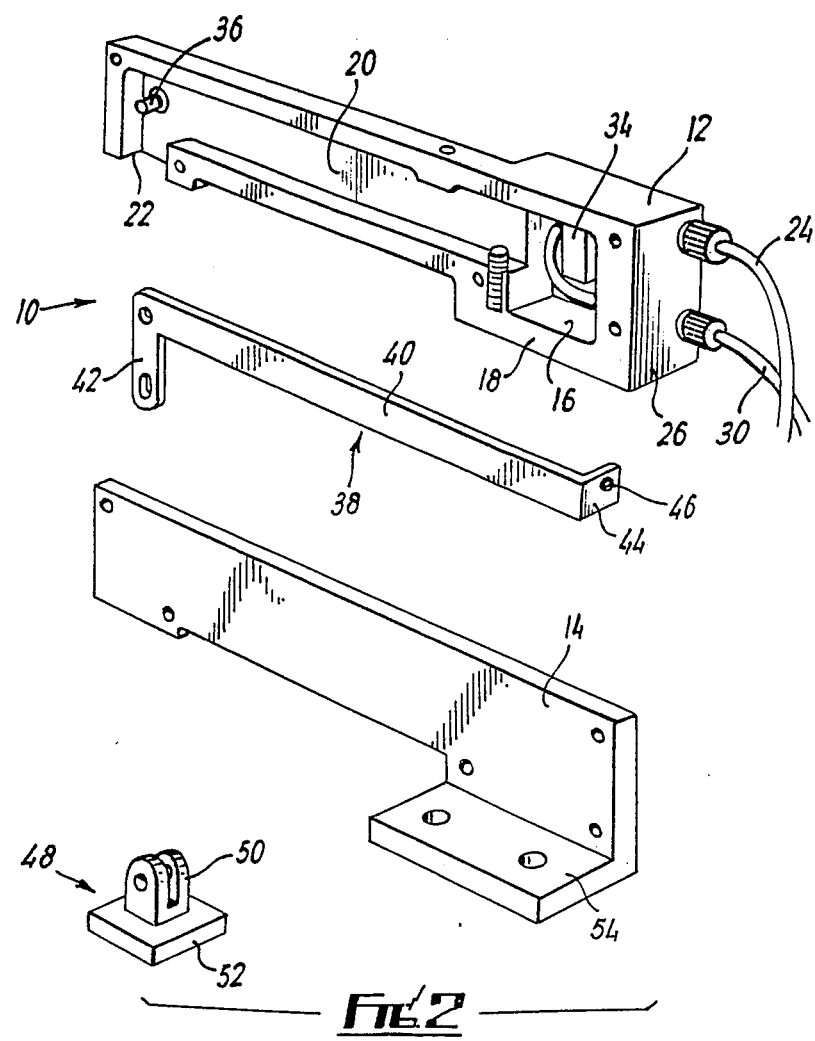
FIG. 2 is an exploded view of the apparatus of FIG. 1.
Figure 3:
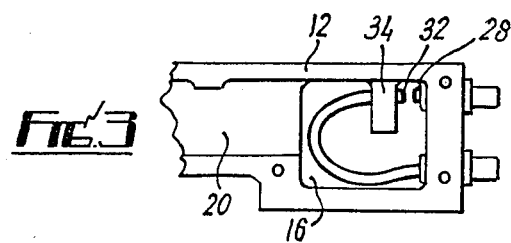
FIG. 3 is an elevation showing part of one of the components of the apparatus.

Referring to the drawings, a detection apparatus or probe has a main body 10 defined by a housing 12 and a cover 14 which is removably mounted on the housing 12. At one end, the housing 12 defines a cavity 16 opening on to one side face 18 and an elongate recess 20 extends from, and is in communication with, the cavity 16 to the other end of the housing 12, the recess 20 also opening onto the side face 18. At the other end, the recess 20 turns through 90° to also open onto an edge 22 of the housing 12. The cover 14 is securable by any suitable means on to the side face 18 and to close the cavity 16 and the recess 20, except for the end thereof which opens onto the edge 22.

On the end of the housing 12 at the cavity 16 a first fibre optic cable 24 is mounted through the end wall 26 of the housing 12 to locate an end 28 within the cavity 16. Also connected to the housing 12 to extend through the end wall 26 is a further fibre optic cable 30 which continues within the cavity 16 and has an end 32 mounted in an internal support 34 to face, and be in alignment with, the end 28 of the cable 24. The cables 24,30 therefore present a path for transmission of a beam of infrared light through the cables 24,30 and across the gap between the ends 28,32.

At the end of the recess 20 remote from the cavity 16 a pivot pin 36 is provided and pivotally mounts a lever 38 of generally bell crank configuration, having a first arm 40 extending along the recess 20 towards the cavity 16 and a second arm 42 extending at substantially 90° to the arm 40 through the opening in the edge 22 of the housing 12.

Within the cavity 16, the arm 40 provides an end section 44 extending at right angles to the main part of the arm 40 and having a through aperture 46. In a normal operating position the end part 44 is positioned in the gap between the ends 28,32 of the cables 24,30 such that the aperture 46 is in alignment with the ends 28,32 thereby enabling continued transmission of the infra-red beam. The end part 44 presenting such an "optical window" is machined to a thickness of 0.030 inches and the aperture 46 is drilled to the same diameter as the cables. The fibre optic cable connector has to be machined as close to the end part 44 with the aperture 46 as possible.

The arm 42 pivotally mounts a foot 48 externally of the housing 12, the foot 48 having a mounting lug 50 for receiving the end of the arm 42 and a pivot pin (not shown) extending through aligned apertures in the lug 50 and the arm 42. The foot 48 also has a pad 52 which is intended to engage with the material in respect of which any structural fault is to be detected.

The body 10 is preferably produced from stainless steel or abs plastic and the lever 4 preferably has a ratio of 1:8 from the foot 48 through the pivot point 36 to the optic window. The movement of the lever can be adjusted to accommodate variations in the degree of accuracy required. The arrangement is such that the slightest movement of the foot 48 will move the lever 40 such as to close the optical window and thus break transmission of the infra-red beam. This break in transmission can be discernable from a remote location to give an early visual and/or audible warning of structural failure, cracks and defects.

The probe can be totally enclosed and sealed, for example with silicon rubber, and, being isolated electrically and thus free from sparking and fire hazards, is particularly useful in hostile environments such as oil rig and airframe work and other inaccessible areas where x-ray and ultrasonic test techniques cannot be used. The probe can be attached to structures by either bonding, strapping or bolting into the required position and the cover 14 has a connecting flange 54 to assist in this.

It will be appreciated that although a single channel device has been described, a multi-channel unit can be provided, giving for example 20 to 30 channels. It is envisaged that a multiplexer will be used in such a multi-channel unit for line selection.

Various modifications may be made without departing from the invention. For example the configuration of the various components may differ from that described and shown provided sufficient movement is derived at the optical window on slightest movement of the foot so that an indication of structural or component failure can be given at any desired location. The apparatus may be controlled at a remote location for example by a microprocessor.

I claim:

1. Apparatus for detecting a structural fault in a material, said apparatus comprising a substantially closed body, sensing means which is pivotally mounted within the body and which provides a first part extending externally of the body for continuous engagement with the material to thereby directly detect any structural fault therein, and a second part presenting a path for transmission of energy therethrough, means for transmitting a beam of said energy and means for receiving the beam of said energy, said second part of the sensing means being normally positioned with the transmission path aligned with the transmitting and receiving means, but being movable in the event of a structural fault on the material being continuously monitored by said first part, whereby to affect the transmission of energy, the energy transmitting means comprising a first fibre optic cable connected to the body with an end located therein for transmission of light into the body and the energy receiving means comprising a further fibre optic cable having an end within the body aligned with said end of the first cable.

2. Apparatus according to claim 1, wherein the fibre optic cables are provided for the transmission of infrared light.

3. Apparatus according to claim 1, wherein the pivotally mounted means comprises a level of generally bell crank configuration having a first arm defining the transmission path at a free end thereof, and a second arm providing said first part at a free end thereof.

4. Apparatus according to claim 3, wherein the length of the first and second arms are in a ratio of 8:1.

5. Apparatus according to claim 3 or 4, wherein said second arm includes said first part in the form of a pivotally mounted foot member.

6. Apparatus according to any of claims 1 to 4, wherein the body is enclosed within a coating of silicon rubber.

* * * * *